US005805782A

United States Patent [19]
Foran

[11] Patent Number: 5,805,782
[45] Date of Patent: Sep. 8, 1998

[54] METHOD AND APPARATUS FOR PROJECTIVE TEXTURE MAPPING RENDERED FROM ARBITRARILY POSITIONED AND ORIENTED LIGHT SOURCE

[75] Inventor: James L. Foran, Milpitas, Calif.

[73] Assignee: Silicon Graphics, Inc., Mountain View, Calif.

[21] Appl. No.: 590,218

[22] Filed: Jan. 23, 1996

Related U.S. Application Data

[63] Continuation of Ser. No. 89,801, Jul. 9, 1993, abandoned.
[51] Int. Cl.⁶ ................................................... G06T 11/40
[52] U.S. Cl. ............................................ 395/126; 395/130
[58] Field of Search ............................... 395/122, 125–130

[56] References Cited

U.S. PATENT DOCUMENTS

| | | | |
|---|---|---|---|
| 4,586,038 | 4/1986 | Sims et al. | 395/130 |
| 4,709,231 | 11/1987 | Sckaibera et al. | 395/126 |
| 4,727,365 | 2/1988 | Bunker et al. | 345/139 |
| 4,807,158 | 2/1989 | Blanton et al. | 395/125 |
| 4,821,212 | 4/1989 | Heartz | 395/126 |
| 4,845,651 | 7/1989 | Aizawa et al. | 395/125 |
| 4,928,250 | 5/1990 | Greenberg et al. | 395/126 |
| 4,943,938 | 7/1990 | Aoshima et al. | 395/126 X |
| 5,025,405 | 6/1991 | Swanson | 364/723 |
| 5,083,287 | 1/1992 | Obata et al. | 395/126 |
| 5,239,624 | 8/1993 | Cook et al. | 395/125 |
| 5,268,996 | 12/1993 | Steiner et al. | 395/126 |
| 5,282,262 | 1/1994 | Kurashige | 395/126 |
| 5,295,199 | 3/1994 | Shino | 395/125 |

(List continued on next page.)

OTHER PUBLICATIONS

"Computer Graphics Principles and Practices, Second Edition", Foley et al., Addison–Wesley Publishing Company, pp. 745–756.

"Casting Curved Shadows on Curved Surfaces", Williams, Proceedings of SIGGRAPH '78, pp. 270–274.

Rendering Antialiased Shadows with Depth Maps:, Reeves, Salesin, and Cook, Proceedings of SIGGRAPH '87, pp. 283–291.

"The RenderMan Companion", Steve Upstill, Addison–Wesley Publishing Company, 1990, Plate 10.

"High–Performance Polygon Rendering", Kurt Akeley & Tom Jermoluk, Computer Graphics, vol. 22, No. 4, Aug. 1988, pp. 239–246.

–Peachey, Darwyn R., "Solid Texturing of Complex Surfaces," Siggraph, vol. 19, No. 3, pp. 279–286 (Jul. 22–26, 1985).

–Segal, Mark et al., "Fast Shadows and Lighting Effects Using Texture Mapping," Computer Graphics, 26,2, pp. 239–246 (Jul. 1992).

Primary Examiner—Anton W. Fetting
Attorney, Agent, or Firm—Blakely, Sokoloff, Taylor & Zafman

[57] ABSTRACT

A method and apparatus for generating interactive computer graphics images using projective texture mapping. The projective texture mapping of the present invention involves the mapping of a texture map onto a scene being rendered from the perspective of an arbitrarily positioned and oriented projection light source. The visual effect is as if the texture map were a slide being displayed onto the objects comprising the scene. During this process, homogeneous texture map coordinates are generated for corresponding geometric primitive vertex points. The vertex points of the geometric primitive are defined in terms of a world coordinate system. The homogeneous texture map coordinates of the vertex points are generated using transformation matrices of world coordinates to screen/clip coordinates and world coordinates to light source/texture map coordinates. Texture map coordinates for the remainder of the points of the geometric primitives are derived through interpolation of the vertex homogeneous texture coordinates. Texture map coordinates are generated during a span iteration process by dividing the two spatial homogeneous coordinates by the depth homogeneous coordinate.

30 Claims, 7 Drawing Sheets

U.S. PATENT DOCUMENTS

| | | | |
|---|---|---|---|
| 5,305,430 | 4/1994 | Glassner | 395/127 |
| 5,307,450 | 4/1994 | Grossman | 395/123 |
| 5,317,689 | 5/1994 | Nack et al. | 395/505 |
| 5,321,797 | 6/1994 | Morton | 395/131 |
| 5,325,471 | 6/1994 | Inoue | 395/127 |
| 5,325,472 | 6/1994 | Horiuchi et al. | 395/127 |
| 5,333,245 | 7/1994 | Vecchione | 395/130 |
| 5,361,386 | 11/1994 | Watkins et al. | 395/130 |
| 5,363,477 | 11/1994 | Kuragano et al. | 395/126 |
| 5,367,615 | 11/1994 | Economy et al. | 395/129 |
| 5,469,535 | 11/1995 | Jarvis et al. | 395/130 |
| 5,537,638 | 7/1996 | Morita et al. | 395/125 |
| 5,566,283 | 10/1996 | Modegi et al. | 395/126 |

METHOD AND APPARATUS FOR PROJECTIVE TEXTURE MAPPING RENDERED FROM ARBITRARILY POSITIONED AND ORIENTED LIGHT SOURCE

This is a continuation of application Ser. No. 08/089,801, filed Jul. 9, 1993, now abandoned.

BACKGROUND OF THE INVENTION

1. Field of the Invention

The present invention relates to the field of computer generated graphics, in particular the rendering of pixels using texture mapping techniques.

2. Prior Art

In the field of computer generated graphics, texture mapping is used to create features on a generated surface. For example, if the wall of a building is the surface being generated, a texture map representing bricks can be generated and applied to the wall to create a brick wall. Alternatively if a stone wall was desired, a texture map representing stones could be used. Generation of a texture map can be accomplished in alternative ways. For example, a photograph could be digitized and stored as the texture map. Or the texture map can be computer generated using known graphics generation techniques.

Texture mapping is a process where a surface of an image is generated and the texture map is applied to that surface. Conceptually, this is similar to pasting a label or decal onto that surface. Typically, the texture is a predefined image (i.e. the texture map). Application occurs by mapping points of the surface to points on the texture map. The points on the surface are then mapped to pixel locations on the screen.

Texture mapping techniques find use outside the areas of providing definition to a surface. Texture mapping rendering techniques have also been utilized in virtual reality systems such as three dimensional flight simulation. In these applications the texture map is a representation of a scene, e.g. city buildings, and is applied to solids representing the buildings that are being flown over.

One known technique for texture mapping is termed projective texturing. In projective texturing, the image is defined as existing on a plane in a three dimensional space which is projected onto arbitrarily oriented polygons which are viewed from a viewpoint which may be positioned independently from the point of projection. Projective texturing has been used in the development of "movies" for use in flight simulation. However, these "movies" are along a predetermined path. Such techniques have not been used for the interactive generation of graphics.

A projection function was described by D. R. Peachey in a paper entitled "Solid Texturing of Complex Surfaces", Siggraph 85, 279–286. The projection function described by Peachey projects the texture so that it is oriented orthogonally to the viewer. For example, if the texture map image was being projected based on a light source, that light source would be at infinity with respect to the texture image. In other words, its projected texture image could not be scaled or viewed from a different perspective.

Other known techniques of texture mapping for interactive image generation depend on the definition of textures as a function of surface coordinates. That is to say that textures were defined when viewed orthogonally from a viewpoint normal to the surface of each polygon. However, this is limiting in that it restricts the orientation of the texture map as it is applied to the surface. For example, if the texture map is to be viewed from a different perspective with respect to the rendered surface, this could not be easily accomplished. Thus, it would be desirable to provide a more general means for applying a texture map on a rendered surface, so that a viewers perspective view of the texture map can be easily changed and the texture image scaled.

SUMMARY

A method and apparatus for generating interactive computer graphics images using projective texture mapping is disclosed. The present invention generalizes traditional texture mapping techniques so that the texture pattern may be defined without reference the surface of an object. The texture is defined at an arbitrary plane in space with respect to an arbitrary projection point. The texture is then projected onto the surface of the object. The object is then projected onto a two dimensional viewing screen. These mappings can be easily changed so as to provide for interactive manipulation of the texture mapping.

The projective texture mapping of the present invention involves the mapping of a texture map onto a scene being rendered from the perspective of an arbitrarily positioned and oriented projection light source. Texture map coordinates are generated during a span iteration process. During this process, texture map coordinates (and corresponding homogeneous texture coordinates) are generated for corresponding geometric primitive vertex points. The vertex points of the geometric primitive are defined in terms of a world coordinate system. Homogeneous texture coordinates for the vertex points are generated using transformation matrices of world coordinates to screen/eye coordinates and world coordinates to light source/texture map coordinates. Texture map coordinates for the remainder of the points of the geometric primitives are derived through interpolation of the homogeneous texture coordinates of vertex points.

Various applications of the underlying concepts are used to create different visual effects. One application is the simulation of the projection of slides or movies onto arbitrary surfaces. A second application is to simulate the effects of spotlights on the illumination of a scene. In both applications, the projected texture map may be scaled and applied from various perspectives.

DETAILED DESCRIPTION OF THE PREFERRED EMBODIMENT

A method and apparatus for projective texturing in interactive scene generation is described. In the following description, numerous specific details are set forth such as iteration of non-projected textures, in order to provide a thorough understanding of the present invention. It will be apparent, however, to one skilled in the art that the present invention may be practiced without such specific details. In other instances, specific implementation details such as circuitry for performing well known arithmetic functions have not been shown in detail in order not to unnecessarily obscure the present invention.

OVERVIEW OF A COMPUTER SYSTEM IN THE PREFERRED EMBODIMENT

Figure 1:
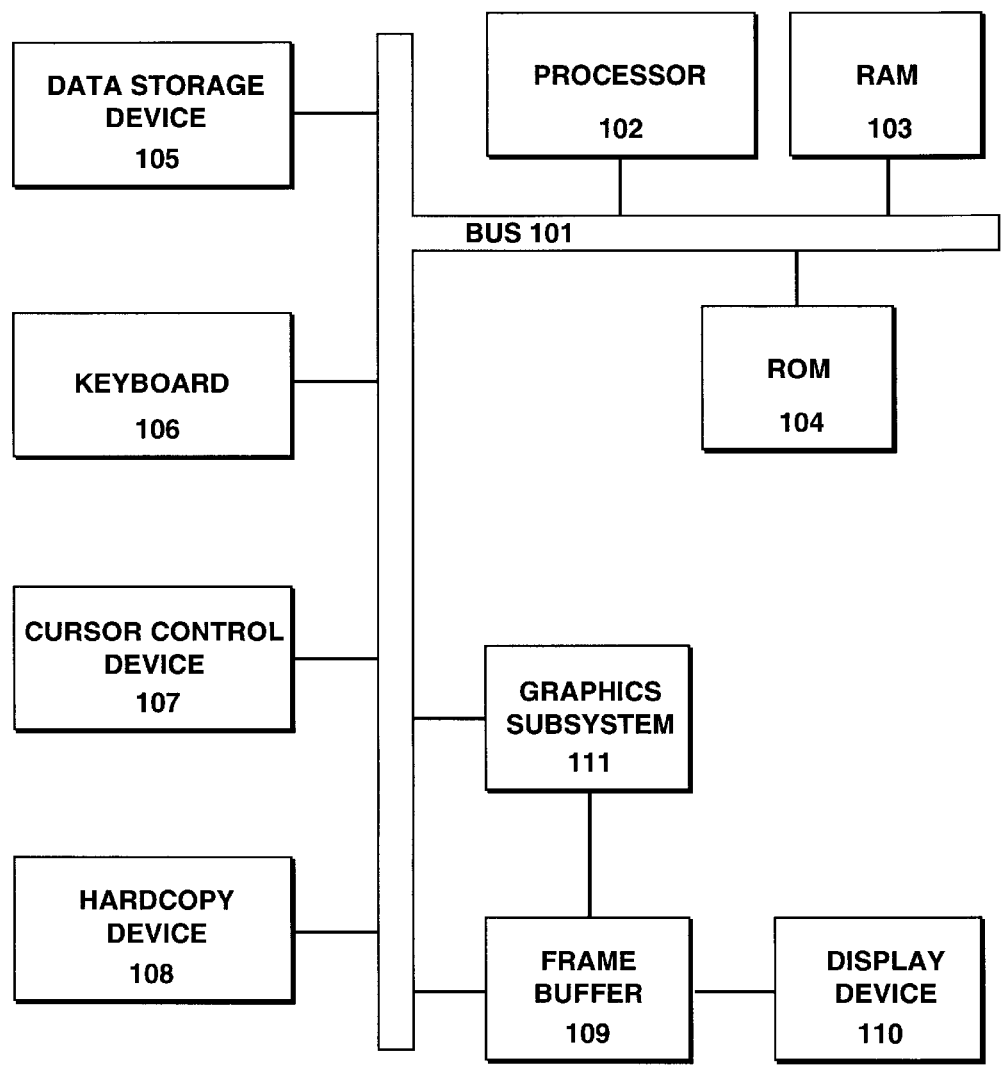
FIG. 1 is a block diagram of a computer system in which the currently preferred embodiment of the present invention may be implemented.

The computer system of the preferred embodiment is described with reference to FIG. 1. The present invention is implemented for use on a computer controlled graphics system for generating three dimensional images such as one of the members of the IRIS® family of systems available from Silicon Graphics, Inc. of Mountain View, Calif. Generally, the present invention may be implemented on any system which performs perspective correct texture mapping. In any event, a computer system as may be utilized by the preferred embodiment generally comprises a bus structure or other communication means 101 for communicating information between the various components of the computer system, a processor means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc., coupled to said bus 101 for communicating information and command selections to said processor 102 and for controlling cursor movement. Additionally, it is useful if the system includes a hardcopy device 108, such as a printer, for providing permanent copies of information. The hardcopy device 108 is coupled with the processor 102 through bus 101.

Also coupled to the computer system of the preferred embodiment is a frame buffer 109 which is further coupled to a display device 110, preferably a display device capable of displaying high resolution color or monochrome graphical images. The frame buffer 109 contains the pixel data for driving the display device 110. The display device 110 is coupled to a graphics subsystem 111. The graphics subsystem 111 is used to generate the pixel data stored in the frame buffer 109. The graphics subsystem 111 is coupled to the bus 101 for communication with the processor 102 and frame buffer 109. Note that the graphics subsystem 111 may be implemented to embody the frame buffer 109.

The graphics subsystem 111 in the currently preferred embodiment would also include a storage means, e.g. a Dynamic Random Access memory (DRAM), for storing one or more texture maps. The graphics subsystem 111 would further include processing means for performing perspective correct texture mapping, i.e. per pixel divisions, during the rendering process. The graphics subsystem 111 would further include processing elements for transforming between coordinate systems, and for other processing needs of the present invention.

Overview Of The Rendering Process Graphics Subsystem of the Currently Preferred Embodiment of the Present Invention The processor of the preferred embodiment provides the graphics subsystem 111 with the visual description of 3D objects. This visual description takes the form of drawing commands and world coordinate vertex data. The world coordinate system is the coordinate system in which the 3D object are described. The visual description describes the object's geometric position, color, and surface normal vectors used for complex lighting calculations. The graphics architecture of the currently preferred embodiment of the present invention performs transformations and other graphics operations to calculate specific pixel values for each of the pixels on display device 110. Object data from the processor is processed by four pipelined graphics subsystems before being displayed on the screen: 1) a Geometry Subsystem, 2) a Scan Conversion Subsystem, 3) a Raster Subsystem, and 4) a Display Subsystem.

The Geometry Subsystem receives the 32-bit or 64-bit graphical data from the processor and converts it to screen-space data. Screen-space data defines an object's positions in a screen coordinate system corresponding to the visible plane of the display monitor screen. The Scan Conversion Subsystem then breaks down points, lines, polygons and meshes thereby producing pixel data. This pixel data is sent to the Raster Subsystem where a z-buffer removes hidden surfaces. The Raster Subsystem also performs various blending and texturing functions on a pixel-by-pixel basis as the pixels are written to image bit-planes, or a frame buffer. Finally, the Display Subsystem reads the frame buffer and displays the image on a color monitor.

Parallelism is exploited extensively throughout the present invention graphics architecture. The multiple-instruction, multiple-data (MIMD) organization of the geometry subsystem allows up to twelve (12) primitives to be processed. The MIMD organization of the scan conversion and raster subsystem allows up to 320 million pixels to be processed per second.

The graphics subsystem of the present invention uses four-megabit DRAMs to construct a high-resolution frame buffer with configurations ranging from 256 through 1024 bits per pixel. This high capacity allows storage of color, depth, and numerous other special-purpose data fields to support advanced rendering features.

Texture Mapping

Producing an image of a three-dimensional scene requires finding the projection of that scene and re-projecting the same onto a two-dimensional screen. In the case of a scene consisting of texture mapped surfaces, this involves not only determining where the projected points of the surfaces should appear on the screen, but also which portions of the texture image should be associated with the projected points.

The present invention generates texture map coordinates based on a variably positioned projection point. The effect is to project the textures onto an object in a scene being rendered, e.g. like projecting a slide onto the side of a building. In the currently preferred embodiment, texture map coordinates are generated for objects (geometric primitives) vertex points. Subsequent texture coordinates are generated through interpolation in the iteration process.

If the image of a three-dimensional scene is to appear realistic, then the projection from three to two dimensions must be a perspective projection. A perspective projection requires a division operation be performed to obtain texture map coordinates. Typically, a complex scene is converted to polygons before projection. The projected vertices of these polygons determine boundary edges of projected polygons. Scan conversion uses iteration to enumerate pixels on the screen that are covered by each polygon. This iteration in the plane of projection introduces a homogenous variation into the parameters (texture coordinates) that index the texture map of a projected polygon. If the homogenous variation is ignored in favor of a simpler linear iteration, incorrect images are produced that can lead to objectionable effects such as texture "swimming" during scene animation. Correct interpolation of texture coordinates requires each coordinate to be divided by a common denominator for each pixel of a projected texture mapped polygon. As will become apparent in the description below, a difference from existing techniques is the generalization of the value of the divisor.

Figure 2:
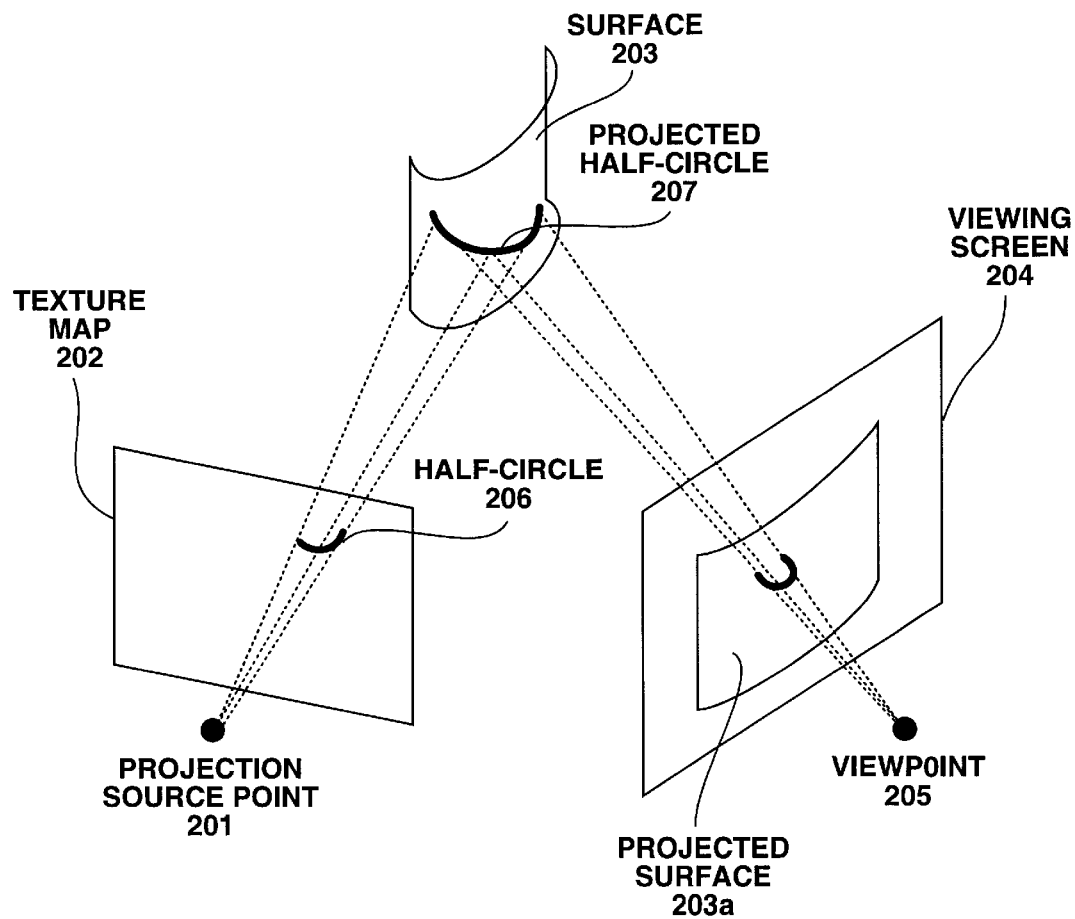
FIG. 2 is a diagram illustrating the concepts of projecting a texture map into a scene and reprojecting the scene onto a viewing screen as performed in the currently preferred embodiment of the present invention.

The present invention provides for arbitrary projection of a texture map onto a surface being rendered. As described above, the texture map is projected into a scene and thus onto objects comprising the scene. Subsequently, the scene is projected onto a viewing screen. FIG. 2 illustrates these basic concepts. Referring to FIG. 2, a texture map 202 is projected onto a surface 203 relative to a projection source point 201. The texture map 202 and projection source point 201 have an arbitrary relationship at arbitrary points in three dimensional space. This provides for scaling and for perspective views of the texture map 202 onto the surface 203. A half-circle 206 on texture map 202 is projected onto surface 203 to create projected half circle 207. So if the texture map 202 and projection source point 201 are repositioned, the half- circle 207 would move correspondingly.

To create the visual image, the surface 203 is then projected onto a viewing screen 204 relative to a viewpoint 205. Illustrated on the viewing screen 204 is the projected surface 203a.

Generation of Projected Texture Map Coordinates

A texture map is addressed by s and t indexes. In the currently preferred embodiment of the present invention, the s and t indexes of the texture map are defined at a reference plane that is a unit distance from a variably positioned projection source point. The direction of projection from the projection source point is denoted as q. The texture is projected into the environment such that s and t are multiplied by the q coordinate of the vertices of the scene objects. The system (sq, tq, q) forms an orthogonal coordinate system in three space which can be generated by a linear transformation of the (x,y,z) system of the scene objects.

When iteration of a coordinate for a non-projected texture takes place in the viewer's coordinate system the depth coordinate is renamed w instead of z. Since the transformation of the viewer's 3D coordinate system to the screen is a reverse projection, x and y are divided by w to obtain screen coordinates. When textures are defined purely in two dimensions it is necessary to account for the reverse projection. For that reason s and t are divided by w, so that quantities s/w, t/w, and 1/w are iterated. These quantities are referred to as homogeneous texture coordinates. At each pixel the first two quantities are divided by the third to yield correct s and t values to index the texture map.

Iteration of projected textures is similar. It is identical to that for a non-projected texture above except that the iterated quantities are sq/w, tq/w and q/w. Angular attenuation is encompassed in the texture since the texture is defined at a plane that is one unit distance from the projection source point. It is this one unit distance that may be changed to cause the scaled projected texture. Attenuation due to distance is then a multiplication of the indexed value by some function of object distance from the projection source point along the q direction.

The iteration process is now described. To aid in the description, five coordinate systems are introduced: the eye clip, screen, light and texture coordinate systems. The eye coordinate system is a three dimensional coordinate system having an origin at the viewers "eye" and oriented along the line of sight of the viewer. The clip coordinate system is a homogeneous representation of three-dimensional space, with x,y, z, and w coordinates. The origin of this coordinate system is a point termed the viewpoint. The term clip coordinate system is used because it is this system in which clipping is often carried out. The screen coordinate system represents the two-dimensional screen upon which a scene is projected. The screen coordinates are obtained from eye coordinates by dividing x and y by w, so that the screen coordinates are given by $X^S=x/w$ and $y^S=y/w$ (the s superscript is used to indicate screen coordinates).

The light coordinate system is a second homogeneous coordinate system with coordinates $x^l$, $y^l$, $z_l$, and $w^l$ (the l superscript is used to indicate light coordinates and $w^l$ corresponds to q as referred to above). The origin of the light coordinate system is at the light source, i.e. the projection source point. Finally, the texture coordinate system corresponds to a texture map. Texture coordinates are obtained from light coordinates by dividing $X^l$ and $y^l$ by $w^l$, so that $x^t=X^l/w^l$ and $y^t=y^l/w^l$ (that superscript is used indicate texture coordinates).

Given ($x^s$, $y^s$), a point on a scan-converted polygon, the goal is to find its corresponding texture coordinates, ($x^t$, $y^t$).

Figure 3:
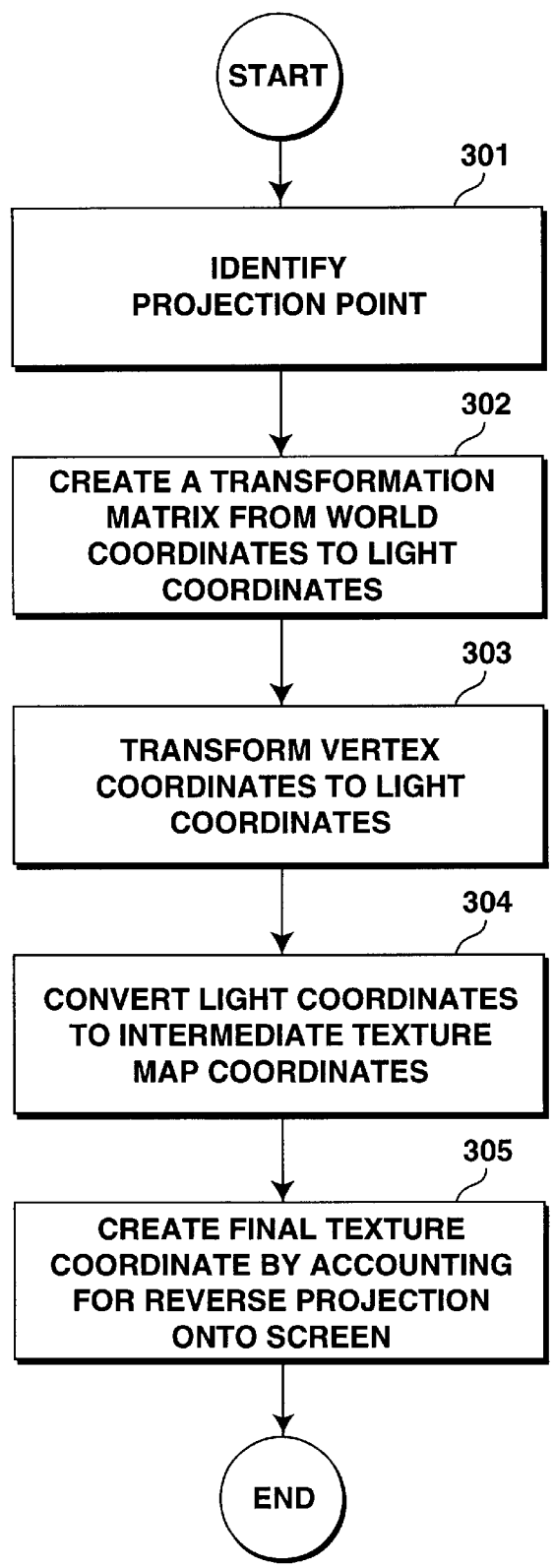
FIG. 3 is a flowchart illustrating the steps for generating a texture map coordinate as may be performed in the currently preferred embodiment of the present invention.

FIG. 3 illustrates and summarizes the steps for generating texture map coordinates for geometric primitive vertex points as performed in the present invention. Referring to FIG. 3, the projection source point is identified, step 301. As noted above, the projection source point may be variably positioned and acts as the origin for the light coordinate system. In order to readily create coordinates in the light system from vertex points of the geometric primitive, a transformation matrix is created, step 302. Essentially, the steps 301 and 302 are set-up functions which are performed for the rendering of a particular scene. Each of the remainder of the steps are performed for each vertex point of a geometric primitive.

When a vertex point is received for processing during scan conversion, the vertex coordinates in the world system are transformed into light coordinates i.e. ($x^l$, $y^l$, $w^l$), step 303. The light coordinates are than converted into intermediate texture map coordinates i.e. ($x^1/w^l$, $y^l/w^l$), step 304. As noted above, texture map coordinates are derived by merely dividing the linear x and y coordinates by the direction coordinate. The steps 303 and 304 effectively cause projection of the texture map into the scene being rendered. In order to account for the reverse projection of the rendered scene into a viewing screen, a final texture coordinate corresponding to the screen point is created by a division of the intermediate texture coordinates by the depth coordinate in the clip system, i.e., $$\frac{x^1/w}{w^1/w}, \frac{y^1/w}{w^1/w}$$

step 305.

Figure 4:
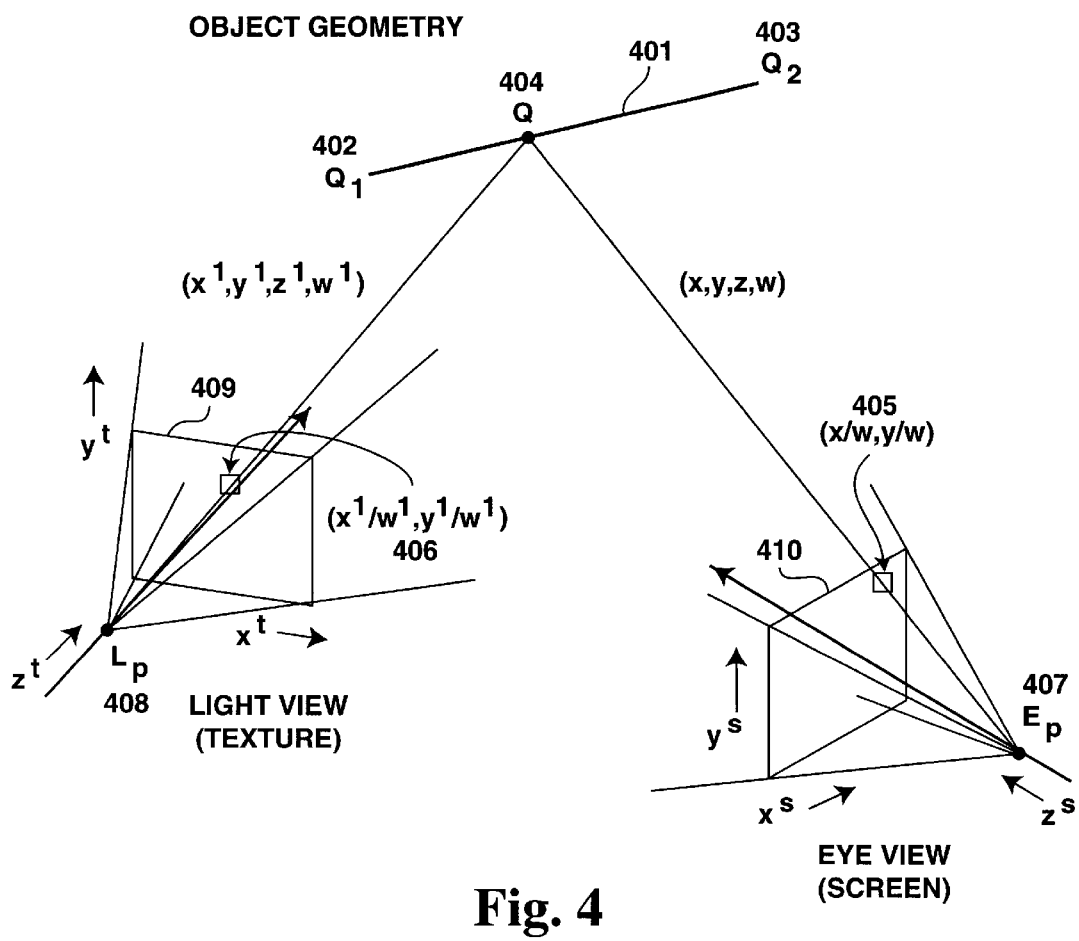
FIG. 4 is a diagram illustrating clip, screen, light and texture coordinate systems as utilized in the currently preferred embodiment of the present invention.

FIG. 4 illustrates the relationship between the various coordinate systems. Referring to FIG. 4a line segment 401 in a eye coordinate system and its projection onto a two-dimensional screen 410, are illustrated. The origin of the eye coordinate system is eye point 407.

The line segment 401 represents a span of a polygon being processed. The line segment has endpoints $Q_1$, 402 and $Q_2$ 403. A point on the line segment 401, e.g. point Q 404, may be found through an interpolation of the endpoints $Q_1$ 402 and $Q_2$ 403. Assuming that point Q 404 has eye coordinates (x,y,z,w), the corresponding screen coordinate is given by (x/w,y/w) at screen coordinate point 405.

Similarly, the point Q 404 will have coordinates $(x^l, y^l, z^l, w^l)$ in the light coordinate system. The light coordinate system has it's origin at light source point 408. The corresponding texture coordinates of texture map 409 are given by $(x^l/w^l, y_l/w^l)$ at texture map coordinate 406.

As discussed above, the goal is to find texture map coordinates given the screen coordinates. In eye coordinates, the endpoints of the line segment 401 are denoted by $Q_1$ 402 and $Q_2$ 403. The values are given by $$Q_1=(x_1, y_1, z_1, w_1) \text{ and } Q_2=(x_2, y_2, z_2, w_2).$$

A point Q 404 along the line segment is identified through linear interpolation and can be written in eye coordinates as $$Q=(1-t)Q_1+tQ_2 \quad (1)$$

for some $t \in [0,1]$ (here t is a linear interpolation weighting value). In screen coordinates, we write the corresponding projected point as $$Q^s=(1-t^s)Q^s_1+t^sQ^s_2 \quad (2)$$

where $Q^s_1=Q_1/w_1$ and $Q^s_2=Q_2/w_2$.

To find the light system coordinates of Q given $Q^s$, the value of t corresponding to $t^s$ (in general $t \neq t^s$) must be determined. This is accomplished by noting that $$Q^s = (1-t^s)Q_1/w_1 + t^sQ_2/w_2 = \frac{(1-t)Q_1+tQ_2}{(1-t)w_1+tw_2} \quad (3)$$

and solving for t. This is most easily achieved by choosing screen coordinates a and b such that $1-t^s=a/(a+b)$ and $t^s=b/(a+b)$. And eye coordinates A and B such that $(1-t)=A/(A+B)$ and $t=B/(A+B)$ are chosen.

Equation 3 becomes $$\frac{aQ_1/w_1 + bQ_2/w_2}{(a+b)} = \frac{AQ_1+BQ_2}{Aw_1+Bw_2}$$

It has been determined that $A=aw_2$ and $B=bw_1$ satisfy this equation, allowing determination of t corresponding to $t^s$ and thus Q.

Because the relationship between light coordinates and eye coordinates is affine (liner plus translation), there is a homogeneous matrix M that relates them:

$$Q^l = MQ = \frac{A}{A+B} Q_1^l + \frac{B}{A+B} Q_2^l \quad (5)$$

where $Q^l_1=(x^l_1, y^l_1, z^l_1, w^l_1)$ and $Q^l_2=(x^l_2, y^l_2, z^l_2, w^l_2)$ are the light coordinates of the points given by Q1 and Q2 in eye coordinates.

We finally obtain $$\begin{aligned} Q^t &= Q^l/w^l \\ &= \frac{AQ_1^l+BQ_2^l}{Aw_1^l+Bw_2^l} \\ &= \frac{aQ_1^l/w_1+bQ_2^l/w_2}{a(w_1^l/w_1)+b(w_2^l/w_2)} \end{aligned} \quad (6)$$

Equation 6 gives the texture coordinates corresponding to a linearly interpolated point along a line segment in screen coordinates. To obtain these coordinates at a pixel, the values $x^l/w$, $y^l/w$, and $w^l/w$, and $w^l/w$, are lineal interpolated and divided at each pixel to obtain $$x^l/w^l = \frac{x^l/w}{w^l/w} \text{ and } y^l/w^l = \frac{y^l/w}{w^l/w} \quad (7)$$

If $w^l$ is constant across a polygon, then Equation 7 becomes $$s = \frac{s/w}{1/w} \text{ and } t = \frac{t/w}{1/w} \quad (8)$$

where we have set $s=x^l/w^l$ and $t=y^l/w^l$. Equation 8 governs the iteration of texture coordinates that have simply been assigned to polygon vertices. It still implies a division for each pixel contained in a polygon. It is important that the more general situation of a projected texture implied by Equation 7 requires only that the divisor be $w^l/w$ instead of 1/w. Thus, the texture can be interactively scaled and manipulated to project onto different portions of the scene being rendered. Furthermore, since the projected texture is defined with a particular spatial reference, no manual assignment of texture coordinates to polygon vertices is necessary.

Uses of the Projective Texture of the Present Invention

To make the various coordinates in the following examples concrete, the world coordinates system is described. This is the coordinate system in which the three-dimensional model of the scene is described. There are thus two transformation matrices of interest: $M_c$ transforms world coordinates to eye coordinates, and $M_1$ transforms world coordinates to light coordinates. Iteration proceeds across projected polygon line segments according to equation 6 to obtain texture coordinates $(x^t, y^t)$ for each pixel on the screen.

Slide Projector

One application of projective texture mapping consists of viewing the projection of a slide or movie on an arbitrary surface. In this case, the texture represents the slide or movie. A multi-pass drawing algorithm is described to simulate film projection.

Each pass entails scan-converting every polygon in the scene. Scan-conversion yields a series of screen points and corresponding texture points for each polygon. Associated with each screen point is a color and z-value, denoted as c and z, respectively. Associated with each corresponding texture point is a color and z-value, denoted $c_t$ and $z_t$. These values are used to modify corresponding values in a frame buffer of pixels. Each pixel, denoted p, also has an associated color and z-value, denoted $c_p$ and $z_p$.

A color consists of several independent components (e.g. red, green, and blue). Addition or multiplication of two colors indicates addition or multiplication of each corresponding pair of components (each component may be taken to lie in the range [0, 1]).

Figure 5:
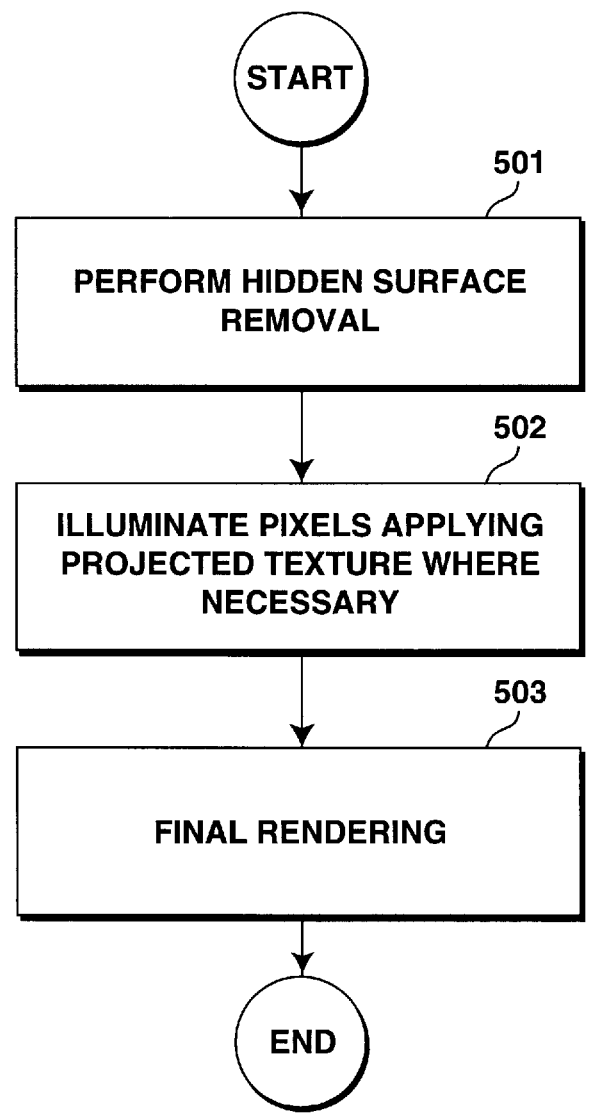
FIG. 5 is a flow chart illustrating the steps for performing projective texture mapping during rendering as may be performed in the currently preferred embodiment of the present invention.

Assuming that zp is initialized to some large value for all p, and that $c_p$ is initialized to some fixed ambient scene color for all p. The slide projection algorithm consists of three passes. These three passes are with reference to the flowchart of FIG. 5. Referring to FIG. 5, a z-buffering step is performed, step 501. The z-buffering step that sets $z_p$ (the front most z-value) for each pixel. z-buffering is a well known technique for excluding from processing, polygons or portions there of, that are behind other polygons (commonly referred to as hidden surface removal). Next, each pixel is illuminated according to the projected texture image, step 502. A test z=Zp is made to ensure that portions of the scene visible from the eye view point are brightened by the texture image only once (occlusions are not considered). Note that the effects of multiple film projections may be incorporated by repeating step 502 several times, modifying the transformation matrix $M_l$ and the light coordinates appropriately on each pass. Also note that the first of a set of multiple film projections may be incorporated in step 501. Finally, the scene is drawn modulating the color of each pixel by the corresponding illuminating color of the projected texture image, step 503. Effects of surface (i.e. non-projective) texture mapping may also be incorporated in this pass.

Figure 6B:
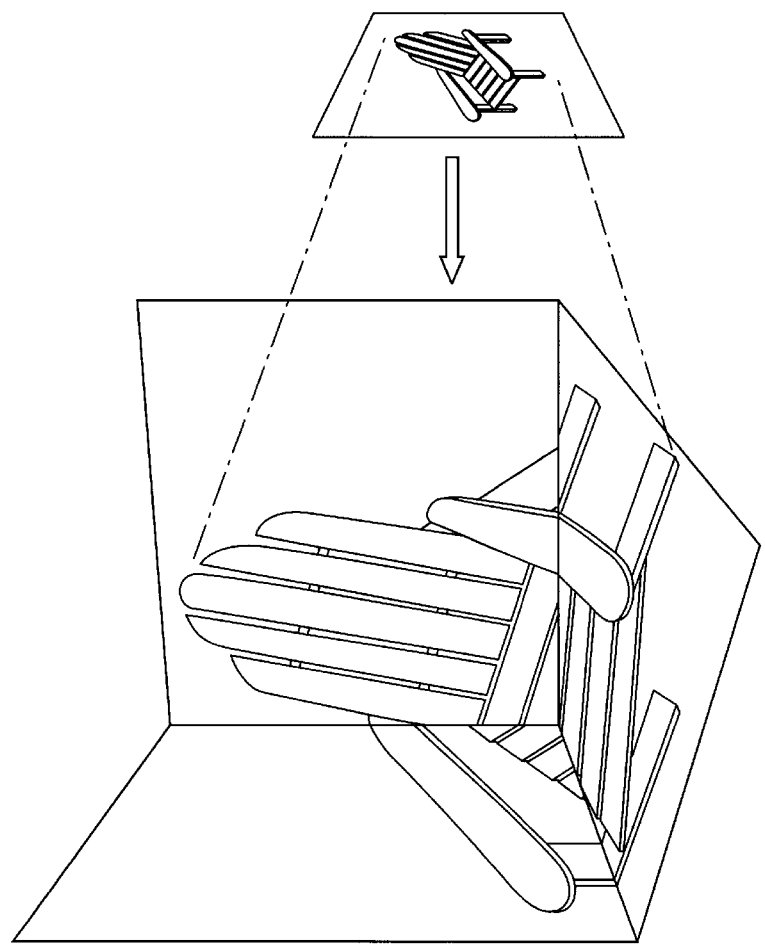
FIG. 6b illustrates the "slide" of FIG. 6 a projected into a scene as may be utilized in the currently preferred embodiment of the present invention.
Figure 6A:
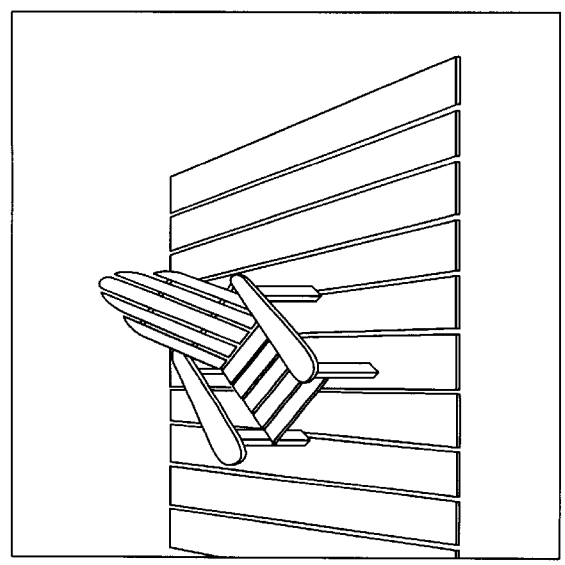
FIG. 6a is an example of texture map as a "slide" as may be utilized in the currently preferred embodiment of the present invention.

FIG. 6a illustrates a texture map "slide" as may be projected into a scene. FIG. 6b shows the slide of FIG. 6a projected onto the objects comprising a scene. FIG. 6b image shows the scene illuminated by both ambient light and the projected slide of FIG. 6a. The projected image may also be made to have a articular focal plane by rendering the scene several times and using an accumulation buffer.

The same configuration can transform an image cast on one projection plane into a distinct projection plane. Consider, for instance, a photograph of a building's facade taken from some position. The effect of viewing the facade from arbitrary positions can be achieved by projecting the photograph back onto the building's facade and then viewing the scene from a different vantage point. This effect is useful in walk-throughs or flight simulation fly-bys. Texture mapping can be used to simulate buildings and distant scenery viewed from any viewpoint.

Spotlights

A similar technique can be used to simulate the effects of spotlight illumination on a scene. In this case the texture represents an intensity map of a cross-section of the spotlights beam. If multiple beams are to be used, a cross section for each beam may be defined. To create such a cross-section, the texture map is generated as if an opaque screen were placed in front of a spotlight and intensity at each point on the screen were recorded. Any conceivable spot shape may be accommodated. The spot shape not only determines the beam limits, but also the falloff due to radial distance since the beam is projected onto the reference plane where the texture is defined. In addition, distortion effects, such as those attributed to a shield or a lens, may be incorporated into the texture map image. Rendering occurs in the same manner as the slide projector algorithm described above.

Radial portion of distance attenuation of illumination is incorporated into the intensity texture map of the spot sources. Attenuation due to source to object distance may be approximated by applying a function of the depth values $z^t = z^l/w^l$ divided by $1/w^l$. $1/w^l$ and $1/w^l$ are iterated along with the texture coordinates $(x^t, y^t)$ at each pixel in the image.

Figure 7B:
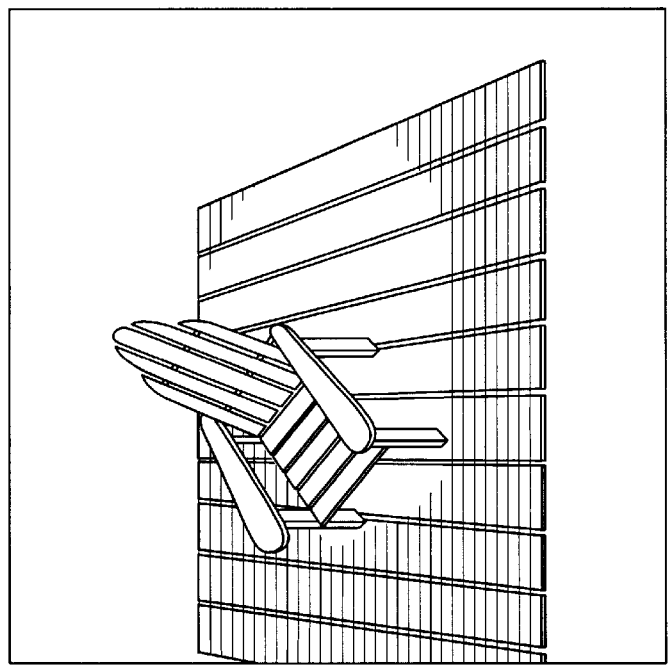
FIG. 7b illustrates the "spotlight" of FIG. 7a illuminating a scene as may be utilized in the currently preferred embodiment of the present invention.
Figure 7A:
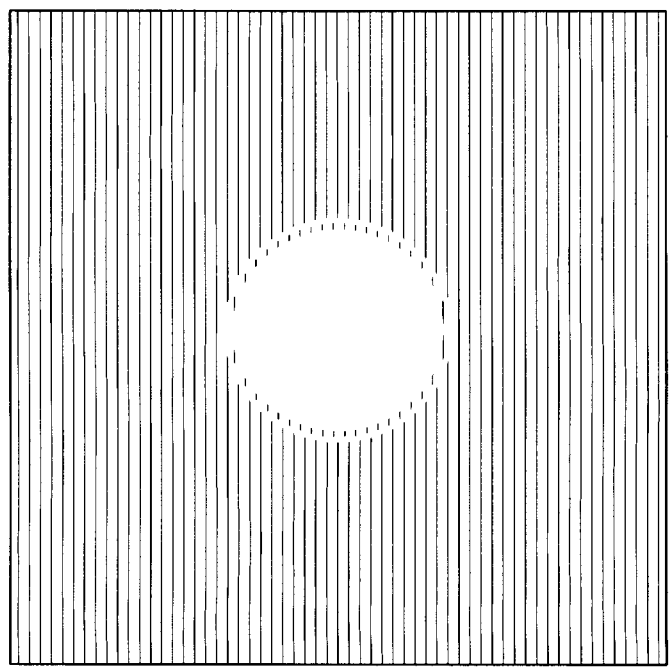
FIG. 7a is an example of the texture map as a "spotlight" or cross section of a beam of light as may be utilized in the currently preferred embodiment of the present invention.

An example of a spotlight into a scene is illustrated with respect to FIG. 7a and 7b. FIG. 7a is a cross-section of light that is used as a texture map. FIG. 7b illustrates the scene as illuminated by the spotlight.

This method of illuminating a scene with a spotlight is useful for many real-time simulation applications, such as aircraft landing lights, directable aircraft taxi lights, and automotive headlights.

Thus, a method and apparatus for projective texturing in an interactive image generation system, is disclosed.

I claim:

1. For a computer controlled display system for interactively displaying three dimensional graphical images, a method for obtaining pixel shading values directly from a texture map for pixels of a geometric primitive, said pixels having coordinates defined relative to an eye coordinate system, said geometric primitive having coordinates defined relative to a three dimensional world coordinate system, and said text map defined relative to a texture coordinate system, said method comprising the steps of:

a) identifying an origin point for a light coordinate system, said origin point being variably positioned, wherein said origin point of said light coordinate system is a source point for projecting said texture map onto said geometric primitive;

b) determining coordinates in said light coordinate system of a point of said geometric primitive from coordinates of said point in said three dimensional world coordinate system;

c) determining intermediate texture coordinates of said point in said texture coordinate system from coordinates of said point in said light coordinate system;

d) determining coordinates of said point in said eye coordinate system from coordinates of said point in said three dimensional world coordinate system; and e) determining final texture coordinates of said point from a depth coordinate of said point's coordinates in said eye coordinate system and from said point's intermediate texture coordinates;

f) wherein said final texture coordinates are used to obtain pixel shading values for shading a pixel on a screen of said display system, said pixel corresponding to said point of said geometric primitive; and g) wherein said final texture coordinates are used to obtain pixel shading values from said texture map.

2. The method of claim 1 wherein said step of determining said point's coordinates in said light coordinate system from said point's coordinates in said world coordinate system comprises the steps of:

a) determining a projection direction for projecting said texture map onto said geometric primitive from said source point;

b) generating a first transformation matrix using said projection direction, said transformation matrix for transforming coordinates in said world coordinate system to coordinates in said light coordinate system; and c) performing a matrix transformation operation between said first transformation matrix and said point of said geometric primitive to create said point's coordinates in said light coordinate system.

3. The method of claim 1, wherein said point's coordinates in said light coordinate system include a first linear coordinate, a second linear coordinate, and a direction coordinate, said step of determining said point's intermediate texture coordinates from said point's coordinates in said light coordinate system comprises the step of dividing said linear coordinates of said point by said direction coordinate.

4. The method of claim 1 wherein said step of determining said point's coordinates in said eye coordinate system from said point's coordinates in said world coordinate system comprises the steps of:

a) generating a second transformation matrix for transforming coordinates in said world coordinate system to coordinates in said eye coordinate system; and b) performing a matrix transformation operation between said second transformation matrix and said point to create said point's coordinates in said eye coordinate system.

5. The method of claim 1 wherein said step of generating a final texture coordinate comprises the step of dividing said intermediate texture coordinates by said depth coordinate of said point's coordinates in said eye coordinate system.

6. The method of claim 1 further comprising the step of generating a first attenuation value for each pixel, wherein said first attenuation value is dependent on distance of said geometric primitive from said projection source point.

7. The method of claim 1, wherein said steps (a) through (e) are performed for each vertex point of said geometric primitive to obtain final texture coordinates for each of said vertex points, said method further comprising the step of interpolating between said final texture coordinates of said vertex points to obtain texture map indexes for a plurality of non-vertex points in said geometric primitive.

8. A method as in claim 1 wherein said texture map is a two dimensional map.

9. In a computer controlled display system for generating and displaying three-dimensional graphical images, a method for interactive projection of a texture map into a three dimensional scene being rendered by obtaining pixel shading values directly from said texture map for pixels of geometric primitives comprising said three dimensional scene, said pixels having coordinates defined relative to an eye coordinate system, said geometric primitives having coordinates defined relative to a three-dimensional world coordinate system, and said texture map defined relative to a texture coordinate system, said method comprising the steps of:

a) interactively positioning and orienting a projection source point relative to said three dimensional world coordinate system;

b) positioning said texture map at a unit distance from said projection source point and at an arbitrary orientation relative to said geometric primitives in said three dimensional scene, wherein said unit distance determines a scaling of said texture map projected into said three dimensional scene being rendered; and c) mapping said texture map through said geometric primitives to the reverse projection of the three dimensional scene onto an arbitrarily positioned and oriented viewing screen, said mapping based on said projection source point and said unit distance, wherein final texture coordinates are used to directly obtain pixel shading values from said texture map.

10. The method as recited in claim 9 wherein said step of mapping said texture map through said geometric primitives to the reverse projection of the scene onto an arbitrarily positioned and oriented viewing screen comprises the steps of:

a) identifying an origin point for a light coordinate system, said origin point being variably positioned, wherein said origin point of said light coordinate system is said projection source point for projecting said texture map onto said geometric primitive;

b) determining coordinates in said light coordinate system of a point of a geometric primitive from coordinates of said point in said world coordinate system;

c) determining intermediate texture coordinates of said point in said texture coordinate system from coordinates of said point in said light coordinate system;

d) determining coordinates of said point in said eye coordinate system from coordinates of said point in said world coordinate system; and e) determining final texture coordinates of said point from a depth coordinate of said point's coordinates in said eye coordinate system and from said point's intermediate texture coordinates;

f) wherein said final texture coordinates are used to obtain pixel shading values for shading a pixel on a screen of said display system, said pixel corresponding to said point of said geometric primitive.

11. A method as in claim 9 wherein said texture map is a two dimensional map.

12. A computer controlled display system for interactively displaying three dimensional graphical images by obtaining pixel shading values directly from a texture map for pixels of a geometric primitive, said pixels having coordinates defined relative to an eye coordinate system, said geometric primitive having coordinates defined relative to a three dimensional world coordinate system, and said texture map defined relative to a texture coordinate system, said computer controlled display system comprising:

a) a processor for processing instructions;

b) input means for providing input;

c) a display for displaying three dimensional graphical images;

d) a graphical image generation means for generating pixel shading values for graphical primitives, each of said graphical primitives comprised of a plurality of vertex points, said graphical image generation means comprises:

a texture map storage means for storing said texture map;

means for identifying an origin point for a light coordinate system, said origin point being variably positioned, wherein said origin point of said light coordinate system is a source point for projecting said texture map onto said geometric primitive;

means for determining coordinates in said light coordinate system of a point of said geometric primitive from coordinates of said point in said three dimensional world coordinate system;

means for determining intermediate texture coordinates of said point in said texture coordinate system from coordinates of said point in said light coordinate system;

means for determining coordinates of said point in said eye coordinate system from coordinates of said point in said three dimensional world coordinate system; and means for determining final texture coordinates of said point from a depth coordinate of said point's coordinates in said eye coordinate system and from said point's intermediate texture coordinates;

wherein said final texture coordinates are used to obtain pixel shading values for shading a pixel on said display, said pixel corresponding to said point of said geometric primitive; and wherein final texture coordinates are used to directly obtain pixel shading values from said texture map.

13. The computer controlled display system as recited in claim 12 wherein said means for determining coordinates in said light coordinate system from said point's coordinates in said world coordinate system comprises:

a) means for determining a projection direction for projecting said texture map onto said geometric primitive from said source point;

b) means for generating a first transformation matrix using said projection direction, said transformation matrix for transforming coordinates in said world coordinate system to coordinates in said light coordinate system; and c) means for performing a matrix transformation operation between said first transformation matrix and said point of said geometric primitive to create said point's coordinates in said light coordinate system.

14. The computer controlled display system as recited in claim 12, wherein said point's coordinates in said light coordinate system include a first linear coordinate, a second linear coordinate, and a direction coordinate, wherein said means for determining said point's intermediate texture coordinates from said point's coordinates in said light coordinate system comprises means for dividing said point's linear coordinates by said point's direction coordinate.

15. The computer controlled display system of claim 12 wherein said means for determining said point's coordinates in said eye coordinate system from said point's coordinates in said world coordinate system comprises:

a) means for generating a second transformation matrix for transforming coordinates in world coordinate system to coordinates in said eye coordinate system; and b) means for performing a matrix transformation operation between said second transformation matrix and said point to create said point's coordinates in said eye system.

16. The computer controlled display system as recited in claim 12 wherein said means for generating a final texture coordinate comprises means for dividing said intermediate texture coordinates by said depth coordinate of said point's coordinates in said eye coordinate system.

17. For a computer controlled display system having a display, and frame buffer memory, an improved graphics subsystem comprised of:

a texture map storage memory;

a geometry subsystem receiving a plurality of geometric primitives representing a three dimensional scene and converting said geometric primitives into data for said display, said geometry subsystem generating final texture coordinates for vertex points of said geometric primitives based on a light coordinate system having an arbitrarily oriented and positioned origin which represents a projection source point relative to a three dimensional world coordinate system, said geometric primitives being defined in said three dimensional world coordinate system, said projection source point being interactively positioned and oriented relative to said three dimensional world coordinate system, said texture map storage memory being coupled to said geometry subsystem and storing a texture map which is positioned at a unit distance from said projection source point and at an arbitrary orientation relative to said geometric primitives, wherein said unit distance determines a scaling of said texture map projected into said three dimensional scene, said geometric subsystem mapping said texture map through said geometric primitives to the reverse projection of the three dimensional scene onto an arbitrarily positioned and oriented viewing screen on said display, said mapping being based on said projection source point and said unit distance;

a scan conversion subsystem coupled to said geometry subsystem and to said texture map storage memory, said scan conversion subsystem generating pixel data by interpolating between final texture coordinates of vertex points to generate texture map indexes and accessing said texture map storage memory in order to determine texture shading values for said pixels, wherein final texture coordinates are used to directly obtain pixel shading values from said texture map;

a raster subsystem coupled to said scan conversion subsystem for storing pixel shading values in corresponding locations in said frame buffer memory, said raster subsystem coupled to said frame buffer memory and to said scan conversion subsystem; and a display subsystem coupled to said frame buffer memory and to said display for reading said frame buffer memory and providing pixel shading values to said display.

18. The improved graphics subsystem of claim 17 wherein said scan conversion subsystem interpolates between final texture coordinates of vertex points of said geometric primitive to obtain texture map indexes for a plurality of points in said geometric primitive.

19. The improved graphics subsystem of claim 17, wherein said computer controlled display system interactively displays three dimensional graphical images by generating indexes into a texture map for pixels of said geometric primitive, said pixels on said display having coordinates defined relative to an eye coordinate system, said geometric primitive having coordinates defined relative to a world coordinate system, and said texture map defined relative to a texture coordinate system, said means for generating texture map indexes for vertex points of said geometric primitive further comprising:

a) means for identifying said origin point for a light coordinate system, wherein said origin point of said light coordinate system is a source point for projecting said texture map onto said geometric primitive;

b) means for determining coordinates in said light coordinate system of a point of said geometric primitive from coordinates of said point in said world coordinate system;

c) means for determining intermediate texture coordinates of said point in said texture coordinate system from coordinates of said point in said light coordinate system;

d) means for determining coordinates of said point in said eye coordinate system from coordinates of said point in said world coordinate system; and e) means for determining final texture coordinates of said point from a depth coordinate of said point's coordinates in said eye coordinate system and from said point's intermediate texture coordinates;

f) wherein said final texture coordinates are used to obtain pixel shading values for shading a pixel on said display, said pixel corresponding to said point of said geometric primitive.

20. The computer controlled display system as recited in claim 19 wherein said means for determining said point's coordinates in said light coordinate system from said point's coordinates in said world coordinate system comprises:

a) means for determining a projection direction for projecting said texture map onto said geometric primitive from said source point;

b) means for generating a first transformation matrix using said projection direction, said transformation matrix for transforming coordinates in said world coordinate system to coordinates in said light coordinate system; and c) means for performing a matrix transformation operation between said first transformation matrix and said point of said geometric primitive to create said point's coordinates in said light coordinate system.

21. The computer controlled display system as recited in claim 19, wherein said point's coordinates in said light coordinate system include a first linear coordinate, a second linear coordinate, and a direction coordinate, wherein said means for determining intermediate texture coordinates in said texture coordinate system for said point from coordinates of said point in said light coordinate system comprises means for dividing linear coordinates of said point by said direction coordinate.

22. The computer controlled display system of claim 19 wherein said means for determining said point's coordinates in said eye coordinate system from coordinates of said point in said world coordinate system comprises:

a) means for generating a second transformation matrix for transforming coordinates in world coordinate system to coordinates in said eye coordinate system; and b) means for performing a matrix transformation operation between said second transformation matrix and said point to create said point's coordinates in said eye coordinate system.

23. The computer controlled display system of claim 22, wherein said means for generating a final texture coordinate comprises means for dividing said intermediate texture coordinates by said depth coordinate of said point's coordinates in said eye coordinate system.

24. For a computer controlled display system for interactively displaying three dimensional graphical images, a method for obtaining pixel shading values directly from a texture map for pixels of a geometric primitive, said pixels having coordinates defined relative to an eye coordinate system, said geometric primitive having coordinates defined relative to a three dimensional world coordinate system, and said texture map defined relative to a texture coordinate system, said method comprising the steps of:

a) identifying an origin point for a light coordinate system, said origin point being variably positioned, wherein said origin point of said light coordinate system is a source point for projecting said texture map onto said geometric primitive;

b) determining for said geometric primitive a first transformation between a coordinate in said light coordinate system and a coordinate in said three dimensional world coordinate system;

c) determining a second transformation between a coordinate in said texture coordinate system and a coordinate in said light coordinate system;

d) determining for said geometric primitive a third transformation between a coordinate in said eye coordinate system and a coordinate in said three dimensional world coordinate system; and e) determining final texture coordinates of a point of said geometric primitive from a depth coordinate of said point's coordinates in said eye coordinate system and from said point's coordinates in said texture coordinate system, wherein said point's coordinates in said eye coordinate system are obtained using said third transformation and said point's coordinates in said texture coordinate system are obtained using said second transformation, and wherein said final texture coordinates are obtained by either (a) dividing said point's coordinates in said texture coordinates system by said depth coordinates of said point's coordinates in said eye coordinates system or (b) multiplying said point's coordinates in said texture coordinates system by a reciprocal of said depth coordinate of said point's coordinates in said eye coordinate system.

25. A method as in claim 24 wherein said points coordinates in said light coordinate system comprise a first linear coordinate, a second linear coordinate and a depth coordinate, and wherein said point's coordinates in said texture coordinate system comprise said first linear coordinate either divided by said depth coordinate or multiplied by a reciprocal of said depth coordinate and said second linear coordinate either divided by said depth coordinate or multiplied by said reciprocal of said depth coordinate.

26. A method as in claim 25 wherein said first transformation is provided by a first transformation matrix, said second transformation is provided by a second transformation matrix and said third transformation is provided by a third transformation matrix.

27. A method as in claim 26 wherein said step of determining a first transformation is a first setup step, said step of determining a second transformation is a second setup step and said step of determining a third transformation is a third setup step.

28. A method as in claim 27 wherein said first, second, and third setup steps are performed once for all points of said geometric primitive.

29. A method as in claim 28 wherein all points of coordinates in said texture coordinate system for said geometric primitive are determined by a division by a common divisor of a coordinate in said light coordinate system or a multiplication by a reciprocal of said common divisor of said coordinate in said light coordinate system.

30. A method as in claim 24 wherein said texture map is a two dimensional map.

* * * * *